United States Patent
Dani et al.

(10) Patent No.: US 10,427,951 B2
(45) Date of Patent: Oct. 1, 2019

(54) WATER PURIFICATION FILTER AND SYSTEM

(71) Applicant: Brita LP, Oakland, CA (US)

(72) Inventors: Nikhil P. Dani, Pleasanton, CA (US); Andrea Diaz, Melrose Park, IL (US); Jonathan McDonald, Danville, CA (US); David Lyons, Pleasanton, CA (US)

(73) Assignee: Brita LP, Oakland, CA (US)

( * ) Notice: Subject to any disclaimer, the term of this patent is extended or adjusted under 35 U.S.C. 154(b) by 343 days.

(21) Appl. No.: 15/241,967

(22) Filed: Aug. 19, 2016

(65) Prior Publication Data

US 2017/0050127 A1  Feb. 23, 2017

Related U.S. Application Data

(60) Provisional application No. 62/207,632, filed on Aug. 20, 2015, provisional application No. 62/356,365, filed on Jun. 29, 2016.

(51) Int. Cl.
*C02F 1/28* (2006.01)
*C02F 1/42* (2006.01)
(Continued)

(52) U.S. Cl.
CPC .............. *C02F 1/003* (2013.01); *B01J 20/20* (2013.01); *B01J 20/28052* (2013.01);
(Continued)

(58) Field of Classification Search
CPC .. C02F 1/003; C02F 1/283; C02F 1/42; C02F 2001/425; C02F 1/66; C02F 2307/04;
(Continued)

(56) References Cited

U.S. PATENT DOCUMENTS

| 313,320 A | 3/1885 | Goodale |
| 619,569 A | 2/1899 | Hewel |

(Continued)

FOREIGN PATENT DOCUMENTS

| CA | 2051056 A1 | 3/1992 |
| CA | 2559637 A1 | 3/2007 |

(Continued)

OTHER PUBLICATIONS

CamelBak: "CamelBak Relay Water Pitcher," published Jan. 22, 2014, p. 1, XP054977371. Retrieved from Internet: URL: https://www.youtube.com/watch?v=01TdZCF8AqY [retrieved on May 18, 2017].

(Continued)

*Primary Examiner* — Matthew O Savage
(74) *Attorney, Agent, or Firm* — Thomas C. Feix

(57) ABSTRACT

In one example, a filter cartridge includes a housing having a fluid entry port and a fluid exit port, and the housing has a chamber in fluid communication with the fluid entry port and the fluid exit port. A first medium is disposed within the chamber and includes a material that serves to change the pH of a fluid passing through the first medium. A filtration medium is disposed in the chamber downstream of the first medium and arranged to receive effluent of the first medium. The filtration medium includes a material configured to remove a metal from a fluid passing through the filtration medium.

11 Claims, 6 Drawing Sheets

(51) Int. Cl.
- *C02F 1/66* (2006.01)
- *C02F 1/00* (2006.01)
- *B01J 47/024* (2017.01)
- *B01J 20/20* (2006.01)
- *B01J 20/28* (2006.01)

(52) U.S. Cl.
CPC .......... *B01J 47/024* (2013.01); *B01J 2220/62* (2013.01); *C02F 1/283* (2013.01); *C02F 1/42* (2013.01); *C02F 1/66* (2013.01); *C02F 2001/425* (2013.01); *C02F 2307/04* (2013.01)

(58) Field of Classification Search
CPC . B01J 47/024; B01J 47/28; B01J 47/15; B01J 20/20; B01J 20/28052; B01J 2220/62
See application file for complete search history.

(56) References Cited

U.S. PATENT DOCUMENTS

| | | | |
|---|---|---|---|
| 1,074,168 | A | 9/1913 | Feinstein |
| 2,689,048 | A | 9/1954 | Powers |
| 3,016,984 | A | 1/1962 | Getzin |
| 3,497,069 | A * | 2/1970 | Winn ...................... B01J 39/04 210/282 |
| 3,535,852 | A | 10/1970 | Hirs |
| 3,554,377 | A * | 1/1971 | Miller .................... B01J 47/028 210/275 |
| 3,662,780 | A * | 5/1972 | Marsh .................... B01J 47/022 137/590 |
| 4,066,551 | A | 1/1978 | Stern |
| 4,096,742 | A | 6/1978 | Musolf et al. |
| 4,154,688 | A | 5/1979 | Pall |
| 4,605,499 | A | 8/1986 | Wise |
| 4,696,742 | A | 9/1987 | Shimazaki |
| 4,764,274 | A | 8/1988 | Miller |
| 4,895,648 | A | 1/1990 | Hankammer |
| 4,948,499 | A | 8/1990 | Peranio |
| 4,969,996 | A | 11/1990 | Hankammer |
| 4,983,288 | A | 1/1991 | Karbachsch et al. |
| 5,061,367 | A | 10/1991 | Hatch et al. |
| 5,076,922 | A | 12/1991 | DeAre |
| 5,106,501 | A | 4/1992 | Yang et al. |
| 5,122,270 | A | 6/1992 | Ruger et al. |
| 5,225,078 | A | 7/1993 | Polasky et al. |
| 5,595,659 | A | 1/1997 | Huang et al. |
| 5,609,759 | A | 3/1997 | Nohren, Jr. et al. |
| 5,681,463 | A | 10/1997 | Shimizu et al. |
| 5,736,045 | A | 4/1998 | Bies et al. |
| 5,904,854 | A * | 5/1999 | Shmidt ..................... B01J 20/20 210/251 |
| 5,919,365 | A | 7/1999 | Collette |
| 5,980,743 | A | 11/1999 | Bairischer |
| 6,004,460 | A | 12/1999 | Palmer et al. |
| 6,161,710 | A | 12/2000 | Dieringer et al. |
| 6,189,436 | B1 | 2/2001 | Brooks |
| 6,193,886 | B1 | 2/2001 | Nohren, Jr. |
| 6,200,471 | B1 | 3/2001 | Nohren, Jr. |
| 6,368,506 | B1 | 4/2002 | Gebert et al. |
| 6,383,381 | B1 | 5/2002 | O'Flynn et al. |
| 6,435,209 | B1 | 8/2002 | Heil |
| 6,565,743 | B1 | 5/2003 | Poirier et al. |
| 6,569,329 | B1 | 5/2003 | Nohren, Jr. |
| 6,589,904 | B1 | 7/2003 | Iwasaki et al. |
| 6,599,427 | B2 | 7/2003 | Nohren et al. |
| 6,638,426 | B1 | 10/2003 | Fritter et al. |
| 6,733,669 | B1 | 5/2004 | Crick |
| 7,473,362 | B1 | 1/2009 | Nohren, Jr. |
| 7,828,969 | B2 | 11/2010 | Eaton et al. |
| 8,051,989 | B1 | 11/2011 | Tondreau |
| 8,080,160 | B2 | 12/2011 | Yanou et al. |
| 8,133,525 | B2 | 3/2012 | Skalski et al. |
| 8,419,818 | B2 | 4/2013 | Page |
| 9,511,315 | B2 | 12/2016 | Cur et al. |
| 10,035,713 | B2 | 7/2018 | Dani et al. |
| 2002/0020673 | A1 | 2/2002 | Nohren et al. |
| 2002/0060176 | A1 | 5/2002 | Mierau et al. |
| 2002/0066700 | A1 | 6/2002 | Dolfel et al. |
| 2002/0083841 | A1 | 7/2002 | Chaouachi et al. |
| 2002/0166811 | A1 | 11/2002 | Walker et al. |
| 2005/0279768 | A1 | 12/2005 | Chatrath |
| 2006/0144781 | A1 | 7/2006 | Carlson et al. |
| 2007/0007296 | A1 | 1/2007 | Guyot |
| 2007/0095758 | A1 * | 5/2007 | Bortun ...................... B01J 20/02 210/669 |
| 2008/0274312 | A1 | 11/2008 | Schelling et al. |
| 2009/0139926 | A1 | 6/2009 | Hassebrauck |
| 2009/0184042 | A1 | 7/2009 | Steed et al. |
| 2010/0170839 | A1 | 7/2010 | Kohl |
| 2010/0219151 | A1 | 9/2010 | Risheq |
| 2010/0266351 | A1 | 10/2010 | Vogel et al. |
| 2010/0282682 | A1 | 11/2010 | Eaton et al. |
| 2011/0079551 | A1 | 4/2011 | Olson et al. |
| 2011/0079572 | A1 | 4/2011 | Olson et al. |
| 2011/0247975 | A1 | 10/2011 | Rapparini |
| 2011/0278216 | A1 | 11/2011 | Hull et al. |
| 2011/0303589 | A1 | 12/2011 | Kuennen et al. |
| 2011/0305801 | A1 | 12/2011 | Beer |
| 2012/0017766 | A1 | 1/2012 | Anson et al. |
| 2012/0055862 | A1 | 3/2012 | Parekh et al. |
| 2012/0061312 | A1 | 3/2012 | Busick et al. |
| 2012/0187036 | A1 | 7/2012 | Risheq |
| 2012/0193282 | A1 | 8/2012 | Wolf et al. |
| 2012/0214375 | A1 | 8/2012 | Kitano et al. |
| 2012/0255890 | A1 | 10/2012 | Cumberland |
| 2012/0292247 | A1 * | 11/2012 | Moon ................ B01D 39/2055 210/446 |
| 2012/0298614 | A1 | 11/2012 | Nelson |
| 2012/0325735 | A1 | 12/2012 | Dicks et al. |
| 2013/0037481 | A1 * | 2/2013 | Lalouch .................. C02F 1/001 210/435 |
| 2013/0095212 | A1 | 4/2013 | Beer |
| 2013/0125748 | A1 | 5/2013 | Taylor et al. |
| 2013/0156897 | A1 | 6/2013 | Goldstein |
| 2013/0175228 | A1 | 7/2013 | Utsch et al. |
| 2013/0233890 | A1 | 9/2013 | Melzer |
| 2013/0319927 | A1 | 12/2013 | Lin |
| 2014/0014566 | A1 * | 1/2014 | Mitchell ................... C02F 1/42 210/266 |
| 2015/0166364 | A1 | 6/2015 | Wiegele |
| 2016/0167980 | A1 | 6/2016 | Dani et al. |
| 2016/0376161 | A1 | 12/2016 | Dani et al. |
| 2016/0376162 | A1 | 12/2016 | Dani et al. |
| 2016/0376163 | A1 | 12/2016 | Dani et al. |
| 2016/0376164 | A1 | 12/2016 | Dani et al. |
| 2016/0376165 | A1 | 12/2016 | Dani et al. |
| 2017/0001880 | A1 | 1/2017 | Dani et al. |
| 2018/0250615 | A1 | 9/2018 | Dani et al. |
| 2018/0264382 | A1 | 9/2018 | Dani et al. |
| 2018/0265374 | A1 | 9/2018 | Dani et al. |
| 2018/0311600 | A1 | 11/2018 | Dani et al. |

FOREIGN PATENT DOCUMENTS

| | | | |
|---|---|---|---|
| CA | 2874153 | A1 | 6/2015 |
| CA | 2933185 | A1 | 6/2015 |
| EP | 0402661 | A1 | 12/1990 |
| EP | 0617951 | A2 | 10/1994 |
| GB | 2268680 | A | 1/1994 |
| GB | 2280596 | A | 2/1995 |
| JP | 657489 | U | 8/1994 |
| WO | 9835738 | A1 | 8/1998 |
| WO | 0071468 | A1 | 11/2000 |
| WO | 2011145640 | A1 | 11/2011 |
| WO | 2012031853 | A1 | 3/2012 |
| WO | 2012150506 | A2 | 11/2012 |
| WO | 2013044079 | A1 | 3/2013 |
| WO | 2013088260 | A1 | 6/2013 |
| WO | 2014089207 | A1 | 6/2014 |
| WO | 2015073144 | A1 | 5/2015 |
| WO | 2015094741 | A1 | 6/2015 |
| WO | 2017055914 | A1 | 4/2017 |

(56) References Cited

FOREIGN PATENT DOCUMENTS

| WO | 2017055915 A1 | 4/2017 |
| WO | 2017055916 A1 | 4/2017 |
| WO | 2017055918 A1 | 4/2017 |

OTHER PUBLICATIONS

Hutton, I.M. 2007, Handbook of Nonwoven Filter Media (1st ed.), pp. 96-99.
Lewatit® Product Information, Lewatit® CNP LF, 5 pgs., 2011.
Lewatit® Product Information, Lewatit® MDS TP 260, 5 pgs., 2017.
NPL-1 ( "Activated Carbon Filter Bags", Filterek) Date: Jun. 4, 2012.
Oxford Dictionary Definition—coextensive, 2017, 1 page.
Oxford Dictionary Definition—immediately, 2017, 1 page.

\* cited by examiner

WATER PURIFICATION FILTER AND SYSTEM

RELATED APPLICATIONS

This application claims priority to, and the benefit of, U.S. Provisional Patent Application Ser. 62/207,632, entitled WATER PURIFICATION FILTER AND SYSTEM, and filed Aug. 20, 2015; and, U.S. Provisional Patent Application Ser. 62/356,365, entitled WATER PURIFICATION FILTER AND SYSTEM, and filed Jun. 29, 2016. All of the aforementioned applications are incorporated herein in their entireties by this reference.

FIELD OF THE INVENTION

Embodiments of the present invention generally concern water filtration systems for pitchers and other fluid containers. More particularly, embodiments of the invention relate to filter cartridges for such devices, and to purification systems incorporating the filter cartridges.

BACKGROUND

Water is beneficial and vital to all life. Indeed, the importance of hydration to overall health and fitness cannot be overestimated. Approximately 60% of the human body is water, and each organ and system requires ample hydration to function properly. From the regulation of body temperature to the proper digestion of food, and even the cushioning and lubrication of bones and joints, water is essential.

Proper hydration also helps the kidneys and liver function properly. The kidneys need water to remove toxins, waste and salt from the blood. When hydration is poor, the liver takes on some of the removal work load of the kidneys and isn't able to properly metabolize excess fat from the body. In addition, water keeps blood from thickening and in return helps the heart function at its peak. Keeping the body properly hydrated helps the heart more easily pump blood through the blood vessels to the rest of the body. Thus, water plays an important role in cardiovascular fitness as well.

Reliably clean water is equally important. The water supply may contain grit, dirt, sediment and rust, or even harmful bacteria and contaminants. Chlorine is typically added to municipal water supplies to stave off harmful or deadly microorganisms. The addition of chlorine to the water supply has been the standard in water treatment since the early 1900s because of its ability to purify the water and destroy waterborne pathogens. The use of chlorine as a purifier, however, is not without its drawbacks. For example, not only does chlorine leave a bad taste and odor in tap water, some studies show that long term exposure to chlorinated drinking water has been linked to increased cancer risk.

Unhealthy levels of other contaminants found in both municipal and well-water supplies also interfere with water's healthy role, reduce the ability of the body to function properly, and can even kill in extreme amounts. Exposure to zinc can cause nausea and vomiting, and the long term effects of anemia and pancreatic damage. While exposure to cadmium, can cause liver damage. Similarly, exposure to copper can cause gastrointestinal distress, and both liver and kidney damage. Finally, exposure to mercury, which is believed to seep into the water supply via landfills, can lead to kidney damage over time.

Bottled water is a quick and convenient solution for clean drinking water, but the expense adds up over time and bottled water requires additional storage space. Discarding plastic water bottles is also wasteful and considered by many to be an environmental blight. A more permanent and cost-effective solution is offered by water filters.

Water filtration has thus become common in homes, offices and other places to produce cleaner and better tasting water. One popular filtration system is used in conjunction with a water pitcher. Some water pitchers include an upper chamber for holding untreated water and a lower chamber for holding treated water that has exited the upper chamber. A filter cartridge is placed in a fluid path between the two chambers so that untreated water exits the upper chamber via gravity, flowing through the filter cartridge, and entering the lower chamber as filtered water.

The filter cartridge typically resides in a receptacle defined by a candle that is located at the bottom of the upper chamber and that is open to both the upper and lower chambers. The filter cartridge includes openings that allow unfiltered water to enter the interior of the filter cartridge where the unfiltered water comes into contact with a filtering medium that acts to remove contaminants from the water as the water flows through the interior of the filter cartridge. Filter cartridges often include a set of air vents at, or near, the top of the filter cartridge which allow air in the filter cartridge to escape as fluid flows into the filter cartridge.

As filtering is completed, the filtered water exits the filter cartridge into the lower chamber. Treated water is then available and ready to be poured from the water pitcher for consumption by a user. Typically, the filter cartridge is removable so that it can be removed and replaced after the usable life of the cartridge.

The filtering medium in such gravity driven, pour-through filters is generally a combination of granular activated carbon (GAC) mixed with ion exchange resins, which remove impurities from the water via adsorption. That is, the activated carbon and ion exchange resins attract and adsorb particles in the water, resulting in better tasting and cleaner water. These filtering materials work together to reduce chlorine taste and odor, zinc, and other harmful contaminants such as copper, mercury and cadmium from the water supply.

As with any pour-through system, however, there is a limited amount of surface area within the filter for adsorbing particles, resulting in the need for periodic changing of the filter cartridge. One drawback to such filters is that the surface area of the filtering media may be reduced by water being poured over the filter. As the inrushing water enters the air vents, the relatively high velocity of that water causes compaction of the filtration media within the filter cartridge.

Compaction is also inherent in these types of filter cartridge configurations containing granular media since there is the need to have a certain minimum amount of granular media to be packed within a small amount of confined space in point-of-use water filtration systems such as pitchers for performance related to contaminant reduction. This compaction reduces the overall surface area available for filtration, thus reducing the effectiveness of the filtration media. Compacted filtration media also presents increased resistance to the fluid that is to be filtered, such that the rate of fluid flow through the filtration media is compromised.

Incoming water may also directly impinge upon the air vents, effectively blocking the air vents and thus preventing the escape of air from the filter cartridge. Because air is prevented from escaping the filter cartridge, a static, or near static, condition results where water cannot easily enter the filter cartridge. This condition is sometimes referred to as airlock and slows the rate at which water flows through the filter cartridge effectively delaying the availability of filtered water.

Yet another drawback of pour-through filters is the possibility of filter media escaping the filter. In the case of activated charcoal, the smallest particles can escape the filter via the inlet and outlet ports resulting in the appearance of black flecks in the filtered water. Although generally harmless, the presence of such particles on the surface of, or suspended in, the filtered water is unsightly and undesirable to the user.

In view of the foregoing, it would be useful to provide a filter cartridge that provides for an improvement in contaminant reduction performance, relative to legacy designs for example, without materially compromising the flow rate of liquid through the filter cartridge. It would also be useful for the filter cartridge to be able to be readily employed in currently available fluid filtration systems without requiring any modification to the structure or operation of those systems.

ASPECTS OF AN EXAMPLE EMBODIMENT

In general, at least some example embodiments are directed to a filter cartridge. One particular example embodiment is directed to a filter cartridge usable with water and employing two different filtration media arranged in a layered configuration. Further example embodiments of the invention also embrace water filtration systems that include a filter cartridge, and one or more of an untreated water reservoir, a treated water reservoir such as a pitcher for example, and a structure, such as a candle for example, configured to releasably retain a filter cartridge.

With reference now to one example embodiment, a filter cartridge is provided through which unpressurized fluid is able to flow solely under the influence of gravity, that is, solely under the influence of hydrostatic pressure. The filter cartridge includes a chamber that holds two or more layers of filtration media situated one above the other. The chamber communicates with a fluid inlet port at an upper end of the filter cartridge and a fluid outlet port at a lower end of the filter cartridge, such that fluid entering the fluid inlet port must pass through the layers of filtration media before exiting the filter cartridge by way of the fluid outlet port.

In this example, the first layer of filtration media comprises, or consists of, one or more agents that serve to change a pH of influent to the first layer such that effluent from the first layer of filtration media has a different pH than the influent to the first layer of filtration media. The first layer of filtration media is disposed directly on top of a second layer of filtration media so that effluent from the first layer of filtration media enters the second layer of filtration media. The second layer of filtration media comprises, or consists of, one or more ion exchange resin(s) (IER). In other embodiments, one or more intervening layers and/or materials can be disposed between the first layer of filtration media and the second layer of filtration media.

In terms of its overall size and configuration, this example filter cartridge may be similar, or identical, to legacy filter cartridges, some examples of which are set forth in one or more Figures of this application, and further examples of which are disclosed in the various documents referenced and incorporated herein. At least some of such legacy filter cartridges are substantially made of plastic and are predominantly white in color and as such, any of the disclosed embodiments can likewise be substantially made of plastic and can be predominantly white in color. Advantageously then, the example filter cartridge can be employed in currently available water filtration systems without requiring any modifications to the configuration or operation of those systems, while also providing for an improvement in one or more aspects of filtration performance relative to currently available filter cartridges.

The foregoing embodiment is provided solely by way of example and is not intended to limit the scope of the invention in any way. Consistently, various other embodiments of the filter cartridge, and water treatment systems incorporating the same, within the scope of the invention are disclosed herein and/or will be evident to one of ordinary skill in the art having the benefit of this disclosure.

BRIEF DESCRIPTION OF THE DRAWINGS

In order to describe the manner in which at least some aspects of this disclosure can be obtained, a more particular description will be rendered by reference to specific embodiments thereof which are illustrated in the appended drawings. Understanding that these drawings depict only example embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
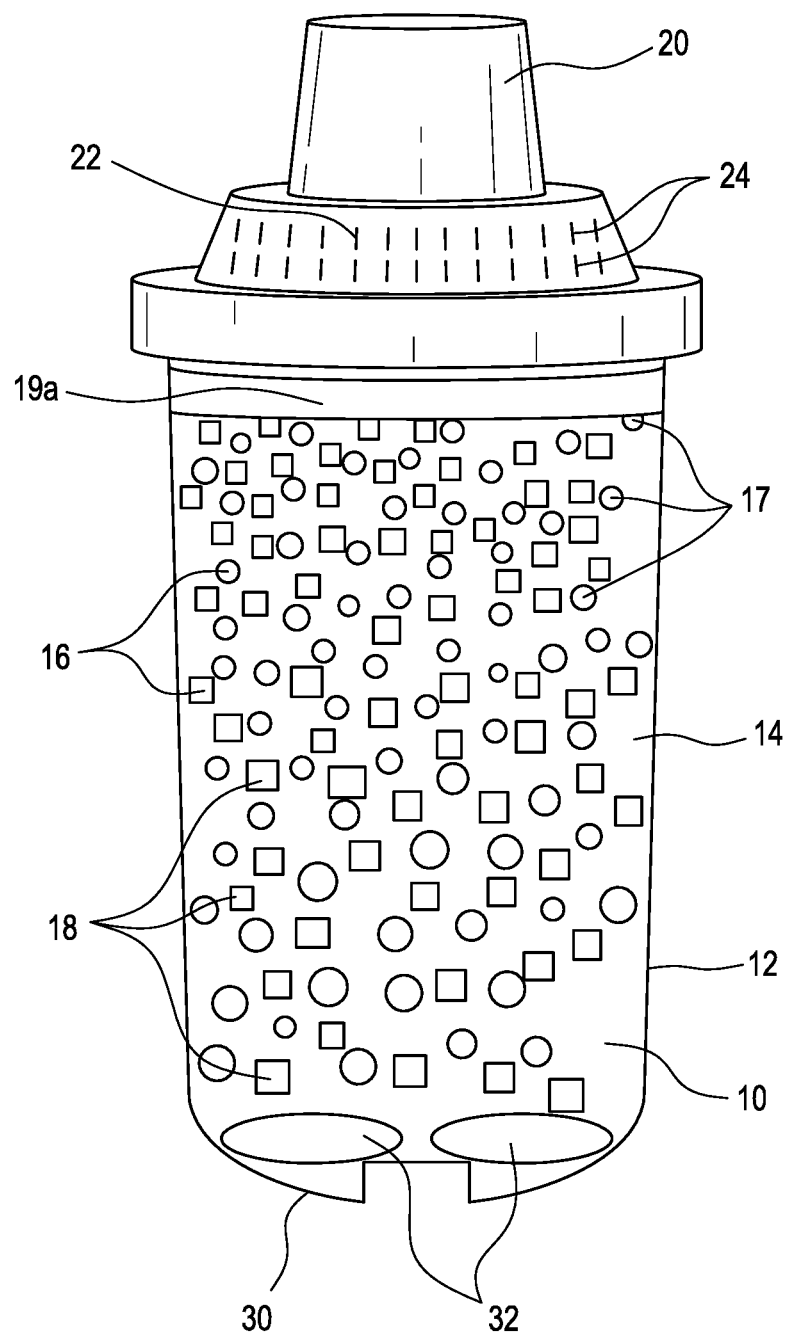
FIG. 1 is a cross sectional side view of an example embodiment of an improved filter cartridge.

Reference will now be made in detail to aspects of various example embodiments of the present disclosure, examples of which are illustrated in the accompanying drawings. While described in conjunction with these embodiments, it will be understood that they are not intended to limit the disclosure to these embodiments.

In general, embodiments of the invention can be employed in a variety of different environments, one example of which is a water pitcher that employs gravity to cause a flow of water to pass through filtration media of a filter cartridge, although the scope of the invention is not limited to this example environment and extends, more generally, to any environment where embodiments of the disclosed filter cartridge can be usefully employed. For example, embodiments of the invention can be employed with any water or fluid container where it is desired to enable a user to utilize a replaceable filter cartridge.

More generally, embodiments of the invention can be employed in any other point-of-use fluid filtration system, examples of which include, but are not limited to, plumbed-in or faucet-mounted systems that rely on pressurized fluid, such as the water pressure of a water supply, as the driving source of filtration, or within large appliances that include water dispensing systems such as refrigerators, water coolers, drinking fountains, and dishwashers. A pressure reducing valve and/or other components can optionally be employed in the aforementioned point-of-use fluid filtration systems to reduce the pressure of fluid entering the filter cartridge. Use of the filter cartridge in these other systems is therefore considered within the scope of the invention.

Some examples of pour-through filtration systems with which embodiments of the filter cartridge can be employed may have an upper reservoir for untreated water, a filter, and a lower collection chamber for filtered water, as disclosed in U.S. Pat. Nos. 4,895,648 and 4,969,996, both to Hankammer, the disclosures of which are incorporated herein in their respective entireties by this reference. Another example of a pour-through filtration system with which embodiments of the disclosed filter cartridge can be employed is described in U.S. Pat. No. 6,638,426 to Fritter et al., the disclosure of which is incorporated herein in its entirety by this reference.

In general, at least some of the disclosed embodiments are concerned with resolving, wholly or in part, the problem of improving filtration performance in a gravity-operated legacy filter, while simultaneously avoiding the need to change the configuration or operational principle of the filter cartridge, and avoiding any significant reduction in flow rate through the filter cartridge.

With reference now to one example embodiment, a filter cartridge is provided through which unpressurized fluid is able to flow solely under the influence of gravity, that is, hydrostatic pressure. The filter cartridge includes a chamber that holds a combination of filtration media. The chamber communicates with a fluid inlet port at an upper end of the filter cartridge and a fluid outlet port at a lower end of the filter cartridge, such that fluid entering the fluid inlet port must pass through the filtration media before exiting the filter cartridge by way of the fluid outlet port. Further example embodiments of the invention also embrace water filtration systems that include a filter cartridge, and one or more of an untreated water reservoir, a treated water reservoir such as a pitcher for example, and a structure, such as a candle for example, configured to releasably retain a filter cartridge.

In one particular embodiment, a filter cartridge is provided that is usable with water and employs a combination of filtration media that includes activated carbon fiber (ACF) as a first filtration medium. In more detail, activated carbon fiber (ACF) material or ion exchange resin fiber (IERF) material, or a combination of both ACF and IERF materials, is disposed in the chamber of the filter cartridge along with another filtration medium, which can take the form of a mixture of granular activated carbon (GAC) and one or more ion exchange resins (IER). Alternatively, the GAC and IER are not mixed together but, instead, form respective layers in the chamber of the filter cartridge, where the GAC layer is the top layer, and the IER layer is the bottom layer. The GAC layer may, or may not, be in direct contact with the IER layer, which can consist of a single filtration medium, or may comprise a blend of multiple filtration media. Compared to the granulated filtration media, that is, the GAC and IER, the ACF and/or IERF material may significantly increase the surface area available for adsorption of contaminants entering the filter cartridge, thereby offering a potential increase in filter life and thus improved performance with respect to existing contaminants targeted by the ACF and/or IERF and/or potential for providing filtration in connection with one or more additional contaminants not targeted by the first filtration media.

Placement of the ACF and/or IERF filtration media adjacent to, or within, the granulated filtration media may also reduce compaction of the granulated filtration media, a common problem caused by the force of water flowing into the filter. The ACF and/or IERF filtration media can be fixed or sealed in place to prevent movement within the chamber, thereby further reducing compaction.

Advantageously, the filtration media in the form of ACF and/or IERF layers as noted, may be incorporated into the design of preexisting filter cartridges with minimal or no redesign of the configuration of filter components. The improved filter cartridge can then be utilized with the same pitchers and water purification systems as earlier versions of the filter cartridge. Thus, the second filtration media, in the form of an activated carbon fabric or ion exchange resin fabric or a combination of both, can be integrated into existing filter manufacturing relatively easily and inexpensively. At least some embodiments of the improved filter cartridge may, with the exception of the inclusion of the second filtration media disclosed herein, be the same as, or identical to, any of the filter cartridge embodiments disclosed in U.S. Pat. Nos. 4,895,648 and 4,969,996, both to Hankammer, and U.S. Pat. No. 6,638,426 to Fritter et al., all of which are incorporated herein in their respective entireties by this reference.

In still other example embodiments, ACF and/or IERF layers are omitted such that only granulated filtration media is present in the chamber of the filter cartridge. This granulated filtration media, which can comprise both GAC and one or more IERs, can assume various forms. In one embodiment, the GAC and IER(s) form a mixture. Alternatively however, the GAC and IER are not mixed together but, instead, form respective layers in the chamber of the filter cartridge, where the GAC layer is the top layer, and the IER layer is the bottom layer. The GAC layer may, or may not, be in direct contact with the IER layer, which can consist of a single IER, or may comprise a blend of multiple IERs.

With respect to the various media configurations noted above, namely, the layered configuration and the mixed configuration, it should be noted that the rate of fluid flow can be affected by the type and/or form of filtration media employed. For example, in some instances, the rate of fluid flow through a filter cartridge with layered filtration media may be relatively slower than a flow rate through a filter cartridge that employs multiple filtration media mixed together rather than being in separate respective layers. The difference in flow rate can be balanced with other considerations, such as the extent to which a particular material, such as zinc for example, is removed by the different respective filter cartridges. Thus, for the purposes of illustration, the filter cartridge with the layered filtration media may exhibit relatively better performance, in terms of zinc removal for example, than the filter cartridge with the mixed media.

Embodiments of the filter cartridge, such as those described above, may further comprise an air dispensing means to better facilitate the removal of displaced air from the filter cartridge. Because of the vertical arrangement of the filter, water to be filtered must enter via the inlet port at the top of the filter, run down through the interior of the barrel under the influence of the force of gravity, and then exit the filter cartridge through the outlet port. Air within the internal cavity of the filter housing is displaced as water moves through the filter. Displaced air can exit the filter either through the inlet port where water is entering or through the outlet port at the base of the filter. The inrushing of water into the filter, however, can cause airlock which can markedly slow down the rate at which water flows through the filter cartridge and ultimately becomes available for drinking.

In order to better facilitate the exit of displaced air through the outlet port, one or more chimney-like tube members are provided. The chimney-like tube members begin at the base of the housing near the outlet port and run vertically up the exterior surface of the housing toward the housing lid or cap. Water passing out of the bottom of the cartridge housing must either flow laterally along the exterior of the housing, or more advantageously, be channeled away from the outlet port and into an air space created by the chimney-like tube members.

One example embodiment of a water treatment system incorporating the improved filter cartridge is a water pitcher. The water pitcher includes a candle in which a filter cartridge can be removably positioned. A filter seat is provided within the candle to interface with the filter cartridge in such a way that a seal is established between the filter cartridge and the filter seat, thus eliminating fluid bypass of the filter cartridge. The candle is configured and arranged for fluid communication with both an untreated water reservoir, and a treated water reservoir, within the water pitcher so that water exiting the untreated water reservoir is able to pass through the improved filter cartridge inserted into the candle, and enter the treated water reservoir for drinking.

The improved filter cartridge of the present disclosure can take any form or configuration consistent with its function and thus is not constrained to any particular form or configuration. In this example embodiment, the layer of activated carbon felt is positioned within the interior cavity of the housing beneath the sieve and above the granulated filtration media, but may be disposed in multiple configurations as disclosed herein.

Conveniently, one example improved filter cartridge of the present invention can be used as a replacement cartridge for preexisting filter cartridges and with preexisting pitchers and other water purification systems. Such replacement can be achieved with minimal cost and effort as the improvements disclosed herein can be generally achieved without having to alter the general shape of preexisting filter or pitcher components. Thus the improved filter cartridges disclosed herein can be easily integrated into existing filter manufacturing.

Example embodiments of the invention include improved gravity fed, pour-through filter cartridges that comprise a housing having one or more fluid entry ports and one or more fluid exit ports. The interior of the housing comprises a first filtration media having a large amount of surface area discontinuously distributed in a plane for adsorption, and a second filtration media with even higher surface area, relative to the first filtration media, more continuously distributed in a plane for prolonged filter life. Thus, dual or double filtration is collectively provided by the first and second filtration media.

Typical fluid filtration media include various purification agents that remove contaminants by chemical and/or physical means. These purification agents include but are not limited to, various forms of blocks, porous, non-porous, granular, fibrous, filamentous or particulate agents either alone or in combination. More specific examples of such purification agents include zeolites, ion exchange resins, activated carbons and mechanical filtration media. Such agents remove contamination from the water through processes such as adsorption, chemical reaction and size exclusion.

Activated carbon comes in many forms such as granular, particulate, and fibrous, and provides a large surface area for adsorption. Activated carbon may be derived from various carbonaceous sources, including but not limited to, nutshells, coconut shells, coconut husks and coir derived therefrom, corn husks, lignite, polyacrylonitrile polymer, charred cellulosic fibers, wood, coal, bituminous coal, agricultural waste, cellulosic materials, bamboo, peat, and petroleum pitch.

Carbon is especially useful as an adsorption media due to the characteristic of small, low-volume pores that increase the available surface area for adsorption and chemical reactions to take place. Types of activated carbon include but are not limited to granular activated carbon ("GAC"), powdered or particulate activated carbon ("PAC"), extruded activated carbon ("EAC"), bead activated carbon ("BAC"), impregnated carbon, and polymer carbonated carbon.

Activated carbon fiber (ACF) and ion exchange resin fiber (IERF) are both available in cloth and fabric forms. Types of such forms include but are not limited to activated carbon felt, activated carbon fiber mats, activated carbon mesh, activated carbon screens, activated carbon foam and sponges, and activated carbon padding. Similar to the types of activated carbon disclosed above, the cloth or fabric forms of activated carbon provide a very high surface area for adsorption, but typically have a much more uniform distribution of micro pores for increased adsorption with potentially no impact on flow rate due to high fluid permeability. Suitable activated carbon fabrics are commercially available, including, but not limited to, those commercially available from Actitex (France), which include a rayon based carbon fiber having a surface area in the range of about 1000 $m^2/g$ to about 1500 $m^2/g$.

Ion exchange resins are also useful for water purification because the resins are capable of exchanging particular ions with undesirable ions in the fluid passing through them effectively removing harmful contaminants from the water. Such resins are typically porous beads having a large surface area for ion exchange and can be divided into four main classes, strong acid cation ("SAC") resins, weak acid cation ("WAC") resins, strong base anion ("SBA") resins, and weak base anion ("WBA") resins. Physical and chemical variations also exist within each class. Most ion exchange resins are based on either a cross-linked polystyrene or acrylic structure with the majority of resins having a styrene-divinylbenzene copolymer bead structure. The final product being either a gel or a macroporous resin.

A more particularized list of water purification agents suitable for the example embodiments disclose herein, includes but is not limited to, KDF-55, KDF-85, KDF-F, KDF-C, brass filings, CuZn, ion exchange media, ion exchange resins, SAC resins, WAC resins, SBA resins, WBA resins, zeolites, alum, activated alumina, mechanical filtration mesh, oxidation media, nonwoven fabrics and materials, GAC, PAC, EAC, BAC, impregnated carbon, polymer carbonated carbon, activated carbon cloth, activated carbon mesh, activated carbon screen, activated carbon padding, activated carbon fabric, activated carbon sponge, activated carbon foam, activated carbon felt, activated carbon fiber mat, and functionalized polymer.

A. Aspects of Some Example Cartridge Embodiments

Directing attention now to FIGS. 1-4, details are provided concerning some example embodiments of the improved filter cartridge, and an example embodiment of a suitable filtration device for use in the filter cartridge.

With reference first to FIGS. 1 and 2, the example filter cartridge 10 includes a housing 12, a cap 20, and a base 30, all of which cooperate to define a hollow cavity 14. The improved filter cartridge 10 is adapted to be utilized with a water filtration system, such as with a conventional pitcher 100 (shown in FIG. 4) having an untreated water reservoir 110, and a filtered water reservoir 120.

The outer components of the filter cartridge 10, which include housing 12, cap 20, and base 30, may be unitary or separate, but in some embodiments, the base 30 and housing 12 are one integral component having the shape of a receptacle or cup. In some embodiments, the housing 12, cap 20, and base 30 are integral with each other and thus have a unitary one-piece construction. In other embodiments, the cap 20 may be separable from the housing 12. The housing 12, cap 20, and base 30 may be constructed of plastic and/or other suitable materials. In some embodiments, such materials are free, or substantially free, of bisphenol A ("BPA").

The cap 20 includes one or more inlet ports 22 that allow the transmission of fluid into the cavity 14. Unfiltered water can thus enter the filter cartridge 10 through an inlet port 22 allowing the unfiltered water access to the filtration media contained within the cavity 14 for filtering. Displaced air from within filter cartridge 10 may also escape through inlet port 22 as water flows into filter cartridge 10. In the embodiment shown in FIG. 1, inlet port 22 comprises sieve 24 providing multiple ports.

Base 30 includes one or more outlet ports 32 that allow the filtered water to exit the bottom of filter cartridge 10 through base 30. The embodiment shown in FIG. 1 may further include mesh (not shown) to prevent the filtration media contained within cavity 14 from exiting filter cartridge 10 along with the now filtered water. In some embodiments, the mesh can be omitted. The inclusion of mesh also eliminates black flecks from any activated charcoal from appearing in the treated water, thus eliminating an undesirable side effect of filtered water, which is a common complaint of users. Mesh may be incorporated above, below, or within outlet port(s) 32, although the mesh could be located in additional, or alternative, locations within the fluid flow path defined by the filter cartridge 10.

The cavity 14 of filter cartridge 10 includes a first filtration media 16. Although any filtration media, or combination thereof, may be used as the first filtration media 16, the filtration media utilized in the embodiment shown in FIG. 1 comprises a combination of granulated activated carbon 17 (shown as circles) and a second filtration media 18 (shown as squares). In addition to the first filtration media 16, filter cartridge 10 further comprises a second filtration media disposed adjacent to or within the first filtration media 16. This second filtration media is indicated by reference 18 in FIGS. 2a-2d, and by reference 19a in FIG. 1.

As shown in the embodiment in FIG. 1, the second filtration media 19a is disposed between sieve 24 of cap 20 and the first filtration media 16. In the example of FIG. 1, the second filtration media 19a comprises a layer, or layers, of ACF material, IERF material, or a combination of both ACF and IERF materials. As in all embodiments, the second filtration media 19a can be fixed or sealed in place to prevent movement of the second filtration media 19a within cavity 14 of the filter cartridge 10 to prevent compaction of the first filtration media 16, although such fixing or sealing in place is not required in all embodiments. Alternatively, the second filtration media 19a may be placed on top of, or within, the first filtration media 16, without being fixed in place, and thus is supported in place by the surrounding first filtration media 16.

Figure 2D:
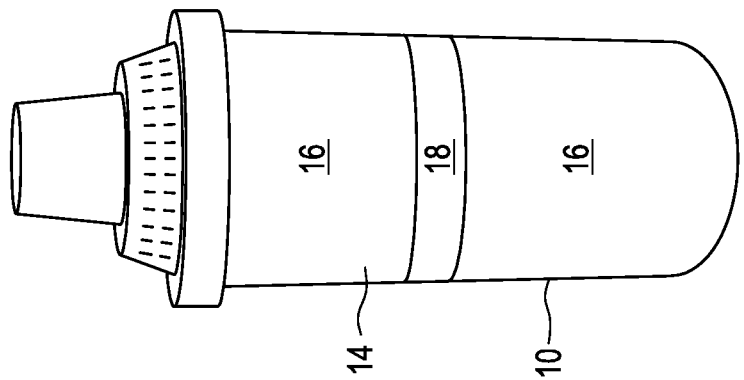
FIGS. 2a-2d are cross sectional side views of additional example embodiments of the improved filter cartridge.
Figure 2C:
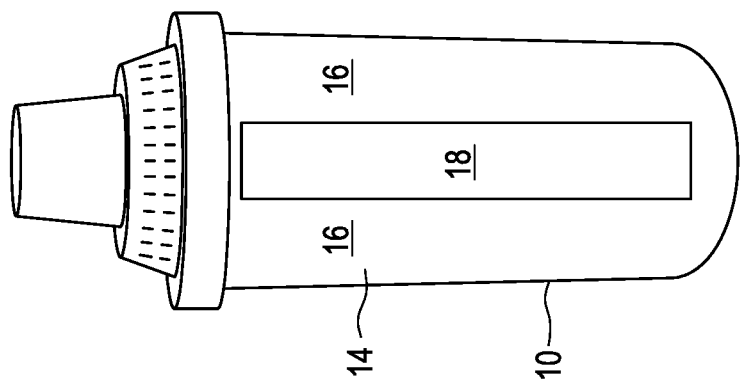
Figure 2B:
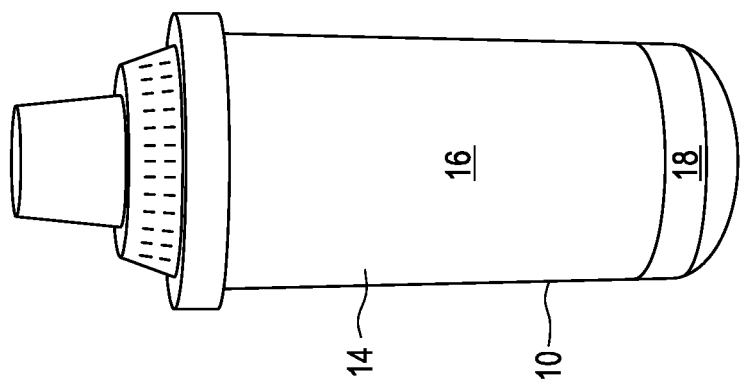
Figure 2A:
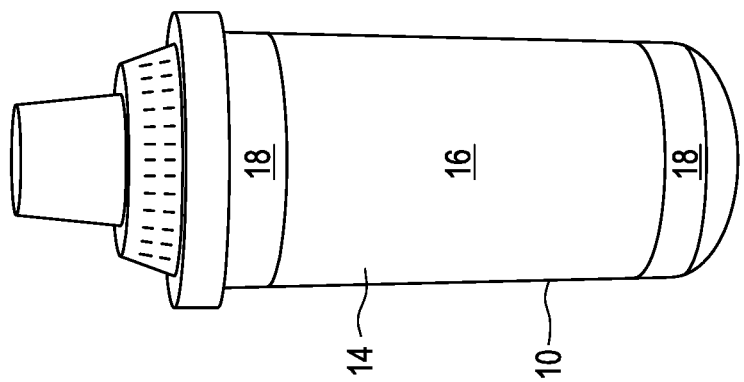

Turning now to FIGS. 2a-2d, alternative embodiments are illustrated showing different placement of the second filtration media 18 in relation to first filtration media 16 within the cavity 14 of filter cartridge 10. As shown in FIG. 2a, multiple portions of the second filtration media 18 are utilized, where each portion comprises a layer in this embodiment. The first layer of the second filtration media 18 is disposed at or near the top of cavity 14 and a second layer of the second filtration media 18 is disposed at or near the bottom of cavity 14. In this embodiment, some or all of the first filtration media 16 is disposed between the two layers of the second filtration media 18.

Turning now to FIG. 2b, another embodiment is illustrated showing a layer of the second filtration media 18 disposed at or near the bottom of cavity 14 of filter cartridge 10. As shown, this layer of the second filtration media 18 is disposed between some or all of the first filtration media 16 and the base of filter cartridge 10.

Yet another embodiment of the improved water filtration cartridge is illustrated in FIG. 2c. As illustrated, the second filtration media 18 can take the form of a strip that is arranged generally vertically along the longitudinal central axis of the filter cartridge 10, with the first filtration media 16 disposed along both sides of the generally vertical second filtration media 18. Alternatively, the first filtration media 16 may completely surround the second filtration media 18. In another variation to the embodiment of FIG. 2c, the second filtration media 18 may have a generally tubular configuration, and one or more of such tubular second filtration media 18 may be employed in the cavity 14.

Turning now to FIG. 2d, an additional embodiment of the improved water filtration filter cartridge 10 is shown wherein a generally horizontal portion, such as a layer for example, of second filtration media 18 is disposed in the middle of cavity 14 with the first filtration media 16 disposed both above and below the second filtration media 18.

B. Aspects of an Example Air Dispensing Means

Figure 3:
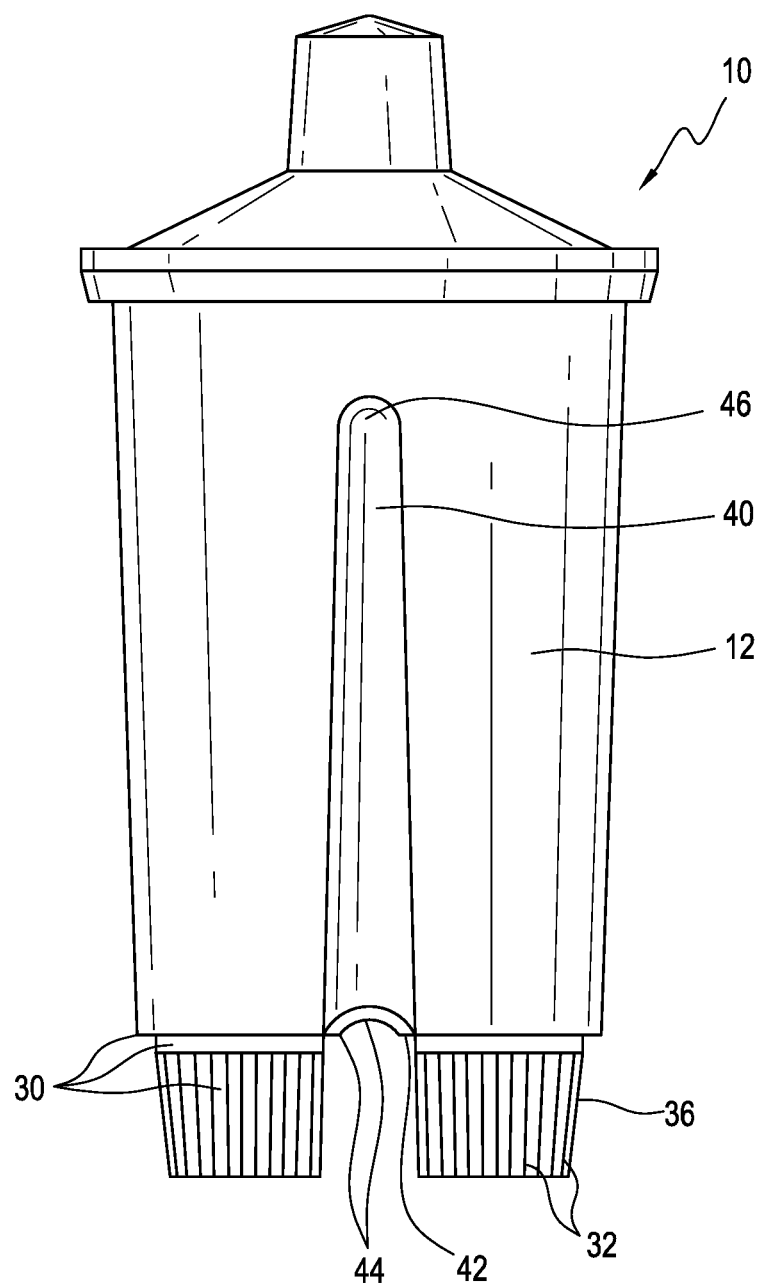
FIG. 3 is a side view of an example embodiment of the improved filter cartridge incorporating an air dispensing means.

Referring now to FIG. 3, an embodiment of the improved water filtration filter cartridge 10 comprising an air dispensing means is illustrated further. As shown in FIG. 3, housing 12 includes an air dispensing means in the form of one or more chimney-like tube members 40 for channeling displaced air out of the filter cartridge. Chimney-like tube member(s) 40 includes an air inlet 42 and an air outlet 46 and runs generally vertically along the outside of housing 12 defining an air space 44 therein.

Air inlet 42 of chimney-like tube 40 is located at the base 30 of housing 12 adjacent to outlet port 32. Air space 44 within chimney-like tube 40 runs vertically toward the top of housing 12 and channels air that has been displaced out of the interior of housing 12. The embodiment shown in FIG. 3 also comprises filter projections 36 that extend downward from the base 30 of housing 12. Outlet port(s) 32 are located on filter projections 36 as a plurality of slotted openings for facilitating the exit of both filtered water and displaced air from housing 12.

In operation, displaced air that is expelled from the bottom 30 through outlet ports 32 can either flow up laterally along the outside wall surface of the housing 12, or alternatively enter chimney-like tube member(s) 40 through air inlet 42 and then travel through air space 44 and out through air outlet 46.

Additional configurations and structure for dispensing or venting air from water purification filter cartridges are disclosed in U.S. Pat. No. 4,969,996 to Hankammer and U.S. Pat. No. 6,638,426 to Fritter et al., the contents of which are incorporated herein by this reference in their entirety as if set forth expressly herein.

As indicated above, the tube members 40 are one example of a structural implementation of a means for dispensing air from a filter cartridge. However, the scope of the invention is not so limited and any other structure(s) capable of implementing comparable functionality could alternatively be employed.

C. Example Filtration System Incorporating Improved Cartridge

Figure 4:
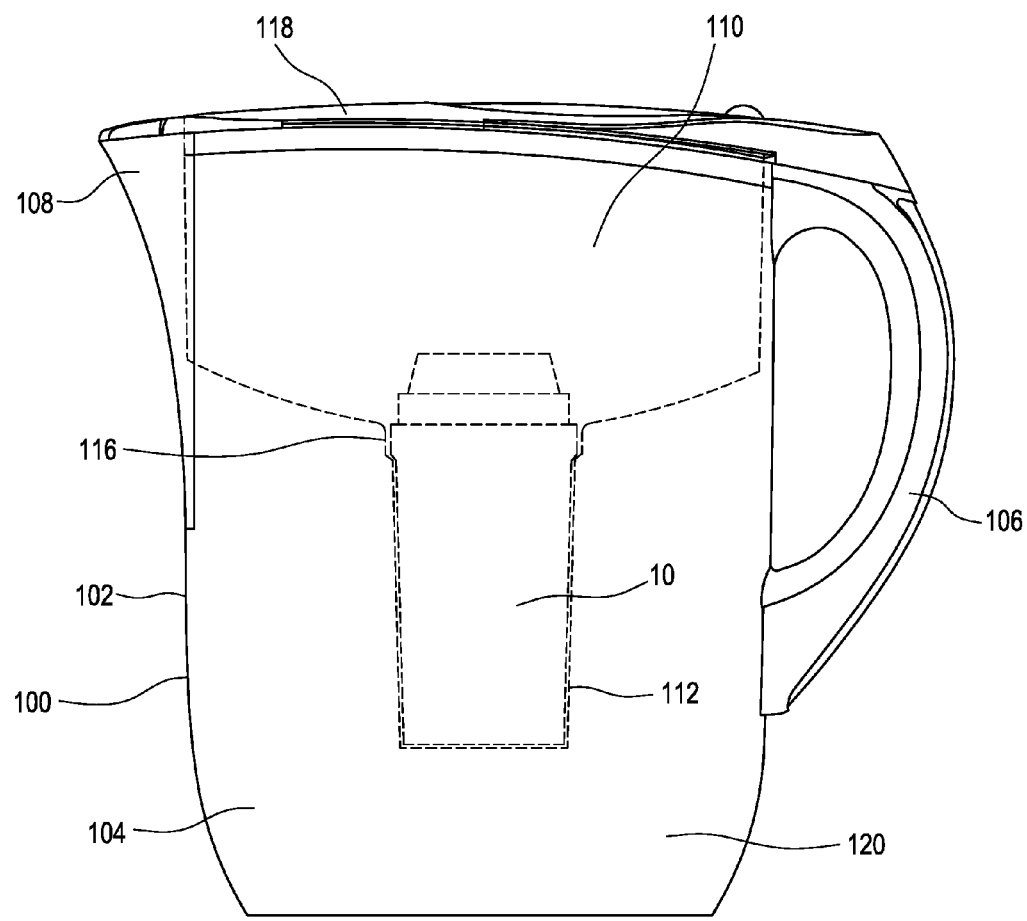
FIG. 4 is a perspective view of an example embodiment of a filtration system in the form of a water pitcher into which the improved filter cartridge can be inserted and utilized.

Directing attention now to FIG. 4, details are provided concerning an example filtration system incorporating the improved water purification filter cartridge 10. The illustrated filtration system comprises a fluid container in the form of a pitcher 100. The pitcher 100 includes a chassis 102 that defines an interior 104. The chassis 102 can be any suitable size or shape. A handle 106 attached to, or integrally formed with, the chassis 102 enables a user to grasp and operate the pitcher 100. Opposite the handle 106, a spout 108 is provided that is in fluid communication with the interior 104 of the chassis 102. In some embodiments, the chassis 102, handle 106 and spout 108 are integral with each other and thus have a unitary one-piece construction, which may be constructed of plastic and/or other suitable materials.

An untreated water reservoir 110 is disposed in the interior 104 of the chassis 102. In at least some embodiments, the untreated water reservoir 110 is configured to be removably received in the chassis 102. The inside dimension of the chassis 102 may be substantially the same as the exterior dimension of the untreated water reservoir 110, such that the untreated water reservoir 110 fits closely within the chassis 102. Thus positioned, and as indicated in FIG. 4, the untreated water reservoir 110 occupies a portion of the upper interior 104 of the chassis 102. In general, the untreated water reservoir 110 serves to receive, and hold for a period of time, water from an external source. The untreated water reservoir 110 may include a recessed portion (not shown) that cooperates with the spout 108 to define a fluid passageway by way of which water can exit the filtered water reservoir 120.

As further indicated in FIG. 4, the untreated water reservoir 110 includes a hollow candle 112 that defines a receptacle within which improved filter cartridge 10, can be removably positioned. The candle 112 is open at its upper and lower ends and, as such, is in fluid communication with the untreated water reservoir 110, as well as with the filtered water reservoir 120, which comprises a portion of the overall interior 104 of the chassis 102. In general, the upper end of candle 112 serves as a fluid inlet, and the lower end of the same serves as a fluid outlet. A filter seat 116 positioned near the upper end of the candle 112 is configured to cooperate with the filter cartridge 10 in the candle 112 to form a seal such that water in the untreated water reservoir 110 can enter the filtered water reservoir 120 only by passing through the filter cartridge 10.

The example water pitcher 100 also includes a cover 118. In general, the cover 118 extends over the untreated water reservoir 110 so that water does not escape from the untreated reservoir 110 when the water pitcher 100 is tilted.

In operation, unfiltered water under the influence of gravity flows from the untreated reservoir 110 down into filter cartridge 10. In particular, the unfiltered water enters filter cartridge 10 through sieve 24 in cap 20, thus entering cavity 14, which contains the first and second filtration media (16 and 18/19a). As the water flows through cavity 14, it is filtered by the filtration media and exits the base 30 of filter cartridge 10 through outlet ports 32, which allow the now filtered water to drain into the filtered water reservoir 120. The filtered water in filtered reservoir 120 is then available for drinking and may be poured from pitcher 100 via spout 108.

In view of the foregoing, it will be appreciated that the disclosed embodiments of the improved filter cartridge are example structural implementations of a means for performing any combination of a variety of different functions. These functions include, but are not limited to, directing fluid flow within a container, channeling displaced air out of the container through the filter cartridge, efficiently removing one or more materials, such as undesirable contaminants for example, from a fluid by providing increased surface area for adsorption in the filtration media, avoiding compaction of the filtration media, and improving the taste, odor and appearance of the water.

The scope of the invention is not limited to the example structures disclosed herein, however, and instead, extends to any other structure(s) capable of performing any combination of the aforementioned functionalities. As well, the aforementioned means is not limited to such functionalities and may perform a variety of additional, or alternative, functions as well.

With reference to the aforementioned example functions, embodiments of the improved filter cartridge may serve to direct the flow of fluid within a container, such as a pitcher, bottle, jug or carafe for example. In general, and as will be evident from the various cartridge configurations disclosed herein, embodiments of the improved cartridge can take any form or configuration consistent with their function(s) and so are not constrained to any particular form or configuration, nor location relative to any water purification system into which the improved filter cartridge is incorporated. Thus, the improved cartridge need not take any particular configuration, orientation, or location. In terms of their overall composition, the example cartridges disclosed herein can be made of any suitable materials, examples of which include glass, plastic, elastomeric materials such as rubber, ceramic, composites, and metal, or any group of one or more of those.

By way of example, NAS® 30 is a styrene acrylic copolymer that has been used in a variety of applications. The copolymer is a clear plastic with high thermal stability and can be used for manufacturing cartridge components, water pitchers and reservoirs such as those disclosed herein. Styrene acrylonitrile, or SAN, is also suitable for such components. Regardless of composition, all components are preferably free of BPA.

D. Aspects of Some Alternative Embodiments of a Filter Cartridge

Figure 5A:
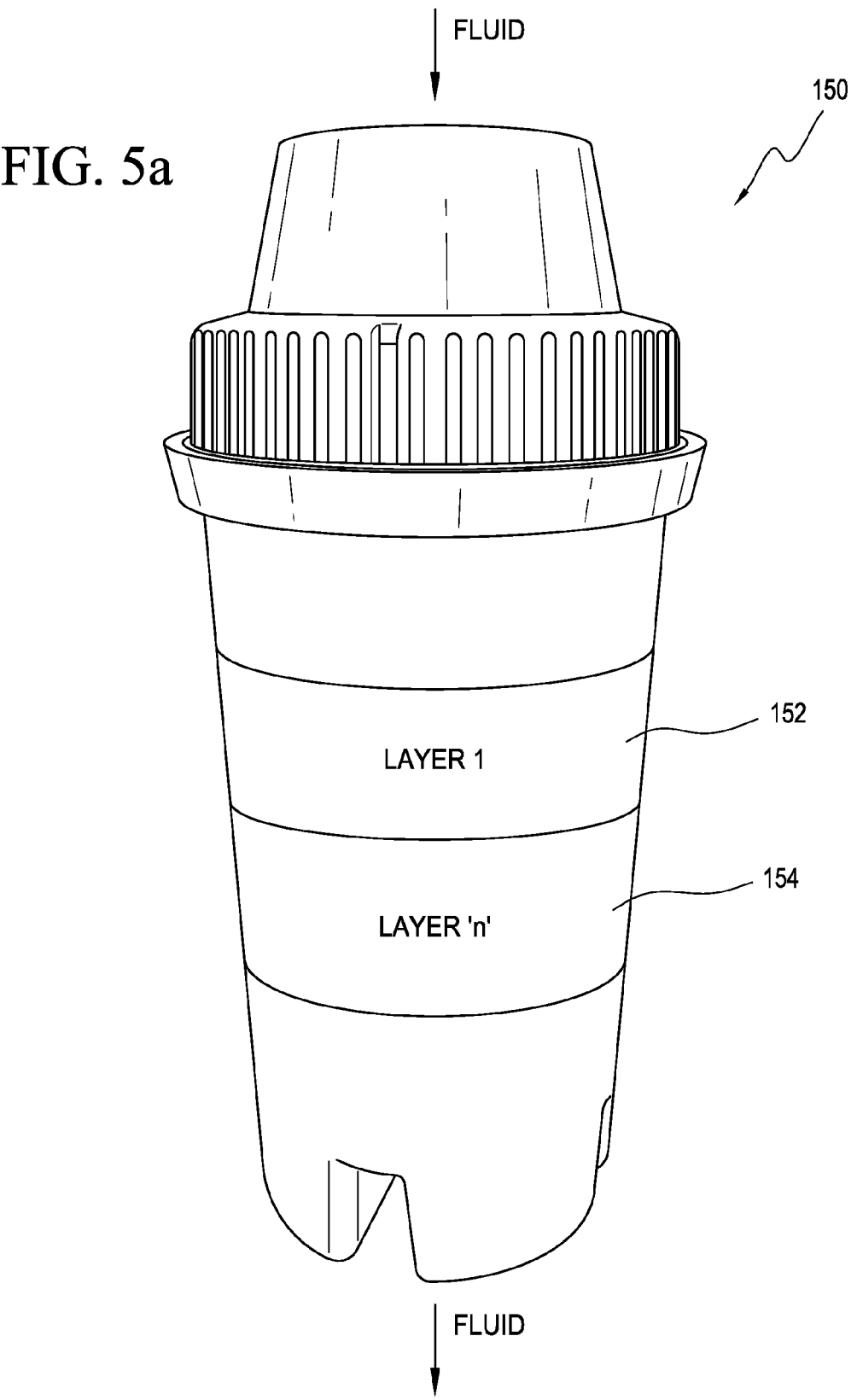
FIG. 5a is directed to an example embodiment of a filter cartridge that includes materials in a layered form.
Figure 5B:
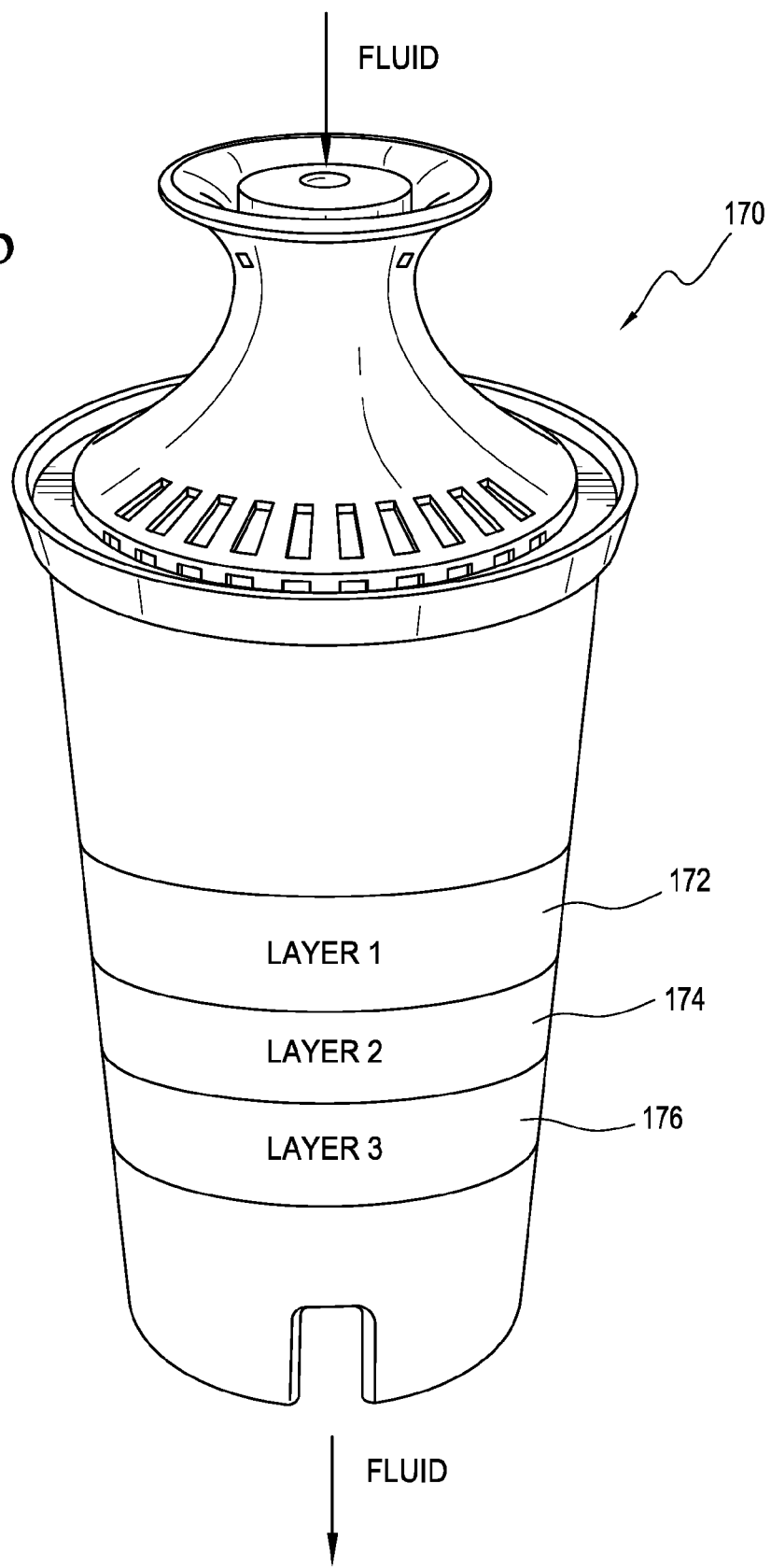
FIG. 5b is directed to another example embodiment of a filter cartridge that includes materials in a layered form.

With attention now to FIGS. 5a and 5b, details are provided concerning still other embodiments of a filter cartridge. In general, one example of a filter cartridge is provided through which unpressurized fluid is able to flow solely under the influence of gravity, that is, solely under the influence of hydrostatic pressure. The filter cartridge includes a chamber that holds two or more layers of filtration media situated one above the other. The chamber communicates with a fluid inlet port at an upper end of the filter cartridge and a fluid outlet port at a lower end of the filter cartridge, such that fluid entering the fluid inlet port must pass through the layers of filtration media before exiting the filter cartridge by way of the fluid outlet port.

In terms of its overall size and configuration, this example filter cartridge may be similar, or identical, to legacy filter cartridges, some examples of which are set forth in one or more Figures of this application, and further examples of which are disclosed in the various documents referenced and incorporated herein. Advantageously then, the example filter cartridge can be employed in currently available water filtration systems without requiring any modifications to the configuration or operation of those systems, while also providing for an improvement in one or more aspects of filtration performance relative to currently available filter cartridges.

Embodiments of the filter cartridge can include two or more layers of media in the chamber of the filter cartridge. Not all of the layers in the chamber need comprise or consist of filtration media. Thus, some embodiments include one or more layers of filtration media, in addition to one or more layers of media that are not filtration media. Yet other embodiments include two or more layers of media, all of which are filtration media. In some embodiments, only filtration media is provided. As well, in at least some embodiments, one or more filtration media layers are not a mixed media layer but rather substantially comprises, or consist of, a single filtration medium.

In any embodiment, the filtration medium, or filtration media, as applicable, can take any of the forms disclosed herein including, for example, a granular form. However, not particular form of filtration medium is required. Thus, some embodiments can include a layer of filtration media, which may or may not be the first layer of filtration media, that comprises, or consists of, a layer of non-woven material. In other embodiments, a filtration medium can have a multilayer structure, such as a layer of ACF positioned between, and adhered to, respective first and second non-woven layers.

Where one or more ion exchange resins (IER) are employed in a filter cartridge, a variety of different IERs can be used. Some examples include CNP-LF (Weak Acid Cation Resin, i.e., WAC resin, CNPS (Weak Acid Cation Resin, i.e., WAC resin), and TP260 (Chelating Resin). As well, blends of any one or more of the aforementioned examples of IERs can be employed in some embodiments. For example, in some particular embodiments, a resin blend includes about 25% TP 260 and about 75% CNP-LF, although other proportions could alternatively be used. As well, single or blended IERs can, in turn, be mixed with yet other materials.

To continue with the immediately preceding example, some embodiments employ a mixed media combination in which the TP 260/CNP-LF resin blend makes up about 55% of the filtration media, and the other 45% of filtration media comprises GAC that is mixed with the resin blend. In still other embodiments, the GAC and IER (either blend of multiple components, or a single component) can be formed in different respective layers in the filter cartridge. At least some embodiments of the invention provide for better metal removal performance than is achieved with the aforementioned 55%/45% combination of the TP 260/CNP-LF blend and GAC.

With continued reference to example IERs that can be used, the IER(s) can be selected based upon their ability to remove particular materials from fluid so as to at least reduce the concentration of that material as the fluid passes through the medium. Such particular materials can include metals, but the scope of the invention is not limited to the removal of metals. For example, some embodiments can remove chlorine (Cl) from fluid so as to reduce the concentration of chlorine in that fluid. One specific example of a metal that an IER, or IER blend, can remove from fluid is zinc (Zn). By way of illustration, any of the IERs CNP-LF, CNPS, and TP260, and any combination of these, may be effective in reducing a concentration of zinc as the fluid carrying the zinc passes through these IER(s). Other materials that can be removed by embodiments of the invention that include an IER, IER blend, or IER layer configuration include, but are not limited to, copper, cobalt, boron, cadmium, mercury, other heavy metals, chromate, lead, nickel, nitrate, and perchlorate.

In at least some embodiments, one of the layers of media may comprise, or consist of, material(s) which serve to change the pH of influent to that layer. For example, a media layer may comprise, or consist of, one or more buffering agents that serve to lower the pH of fluid that passes through that media layer such that the fluid becomes either acidic, or relatively more acidic. Some example buffering agents which can reduce the pH of a fluid include aluminum sulfate, calcium and sodium citrate, calcium, magnesium, and sodium acetate. Organic buffers can also be used. Any of the buffers can take various forms, such as granules or tablets for example, and may incorporate dissolution control mechanisms such as encapsulation or surface coatings.

As another example, a media layer may comprise, or consist of, one or more agents that serve to raise the pH of fluid that passes through that media layer, such that the fluid becomes either less acidic, or basic. Some example agents that can raise the pH of a fluid include calcium, magnesium and sodium carbonates, and calcium, magnesium and sodium bicarbonates.

Thus, the pH adjusting agents can increase the effectiveness of a given IER, or IER blend, in removing metals by modulating pH, either higher or lower depending on type of IER used. Depending upon the arrangement of the layer that includes the pH adjusting agent(s) with respect to the IER layer, the pH adjusting agent(s) may, in some embodiments, adjust the pH of a flow of fluid immediately prior to a time when that fluid first makes contact with the IER(s). This could occur, for example, when the IER layer is located immediately downstream, and in contact with, the layer that includes the pH adjusting agent(s). In other embodiments, effluent from the layer that includes the pH adjusting agent(s) may be immediately directed to an IER layer but may instead pass through one or more intervening layers positioned between the IER layer and the layer that includes the pH adjusting agent(s).

Thus, the aforementioned media layers are example structural implementations of a means for changing a pH of an influent, a means for raising a pH of an influent, or a means for lowering a pH of an influent, as applicable. Any other structure(s) of comparable functionality may alternatively be employed.

It should be noted that the pH changes that can be effected by the use of a layered scheme provide an unexpected advantage relative to the use of a mixed media layer. In particular, mixed media do not provide the pH change zone that is afforded by the use of a discrete pH change layer. As discussed below, the use of a discrete pH change layer is advantageous.

In particular, the pH change effected by a media layer, which may or may not be a filtration media layer, may have desirable effects both in terms of the overall performance of the filter cartridge, and with respect to other filtration media in that filter cartridge. For example, some filtration media that is capable of removing one or more metals from a fluid may perform relatively better when presented with influent fluids, such as from a media layer that implements a pH change, having a relatively lower pH than with fluids having a relatively higher pH.

By way of illustration, an IER, or IER blend, that comprises one or more cationic resins that is capable of removing zinc from a fluid tends to remove relatively more zinc, as between first and second zinc-bearing fluids, from the zinc-bearing fluid that has the relatively lower pH. Advantageously, this relative improvement in zinc removal performance can enable the use of relatively less IER, which may be expensive, than would otherwise be the case. On the other hand, an IER, or IER blend, that comprises one or more anionic resins may tend to remove relatively more metal, as between first and second metal-bearing fluids, from the metal-bearing fluid with the relatively higher pH.

In either of the aforementioned cases, the material(s) of the pH adjusting layer(s) can be selected based upon the material(s) desired to be removed by the IER or IER blend and/or based upon the IER(s) desired to be used. More particularly, the pH of the influent to the IER or IER blend layer can be adjusted, by selection of the appropriate pH adjusting layer(s), for a relative improvement in performance of the IER or IER blend that is to be used. In some particular example embodiments, such as where a layered arrangement of TP 260 and CNP-LF are used, a pH of an influent to the layered arrangement may be lowered from between about 7 and about 8, to about 4.

The performance of the IER or IER blend can also be adjusted by varying the form in which the IER is employed in the filter cartridge. For example, in the particular case of the IERs CNP-LF and TP260, the performance of those resins can vary depending upon their physical configuration and arrangement within the chamber of the filter cartridge. In particular, a layer of mixed CNP-LF and TP260 may remove a metal, such as zinc, from a fluid relatively better than if separate respective layers of CNP-LF and TP260 were used in the filter cartridge. As noted herein, in other cases, a layered configuration of IERs may perform better than a blended or mixed configuration of those IERs.

In a related vein, the fluid flow rate through the IER(s) in the filter cartridge chamber can be made to vary depending upon the physical configuration and arrangement of the IER(s) within the chamber of the filter cartridge. For example, in some instances, the fluid flow rate through a layered configuration of IERs may be relatively lower than the fluid flow rate through a mixture of IERs. Notwithstanding the different IER configurations that may be employed in various embodiments of the invention, fluid flow rates associated with the various different embodiments of the invention may nonetheless remain within a range that provides a satisfactory consumer experience, namely, in a range of about 3 min/L to about 10 min/L. As well, such embodiments of the invention may provide for a reduction of a metal, such as zinc, from about 10 ppm (filter cartridge influent) to about 5 ppm (filter cartridge effluent). Effluent with about 5 ppm zinc is adequate to satisfy NSF certification claim requirements.

With particular reference now to FIGS. 5a and 5b, details are provided concerning some particular example embodiments of a filter cartridge, one of which is denoted generally at 150. As the structure and configuration of example filter cartridges is discussed above in connection with FIGS. 1-4, the following discussion is primarily concerned with the media employed in the chamber of an example filter cartridge.

As indicated in FIG. 5a, the filter cartridge can include any number of layers of media, that is, from a first layer 152 to an $n^{th}$ layer 154, where 'n' is 2 or greater. In one particular embodiment, the media in the chamber of the filter cartridge consists of two layers. It will be appreciated that a two layer configuration can include various combinations of materials.

Some example implementations of a filter cartridge containing media that consists of two layers are addressed below.

In a first embodiment that consists of two layers, the first layer 152 substantially comprises GAC and the second layer 154 consists of a single IER. In a second embodiment that consists of two layers, the first layer 152 substantially comprises GAC and the second layer 154 substantially comprises any combination of the IERs disclosed herein. In a third embodiment that consists of two layers, the first layer 152 consists of, or substantially comprises, a medium that serves to change the pH of a fluid passing through the first layer 152, and the second layer 154 consists of a single IER. A fourth embodiment that consists of two layers is the same as the third embodiment that consists of two layers except that the second layer 154 substantially comprises any combination of the IERs disclosed herein. Fifth and sixth embodiments that consist of two layers are the same as the third and fourth embodiments, respectively, except that the first layer 152 consists of, or substantially comprises, a medium that serves to lower the pH of a fluid passing through the first layer 152 and into the second layer 154. Seventh and eighth embodiments that consist of two layers are the same as the third and fourth embodiments, respectively, except that the first layer 152 consists of, or substantially comprises, a medium that serves to raise the pH of a fluid passing through the first layer 152 and into the second layer 154.

In any embodiment herein, including the immediately preceding embodiments, that includes a medium that serves to lower the pH of a fluid passing through that medium, the medium can take the form of one or more buffering agents. As well, in any embodiment herein, including the immediately preceding embodiments, that includes a medium, or media, that serves to change the pH of a fluid passing through that medium, either by raising or lowering the pH, the medium can by carried by a non-woven layer. The non-woven layer can consist of, or comprise, ACF and/or IERF, but neither ACF nor IERF is necessarily required, and any other suitable non-woven(s) can alternatively be used.

Table 1 below indicates various possible combinations of materials that can be used to implement media in the chamber of a filter cartridge. In general, any upper layer can be used in combination with any lower layer. The combinations embraced by Table 1 can be used in an arrangement that consists of two layers, as well as in arrangements that comprise two or more layers. As well, the upper layer can have more than one listed component, such as an upper layer that includes both ACF and IERF. As another example, the upper layer can take the form of a non-woven that carries one or more agents that modify the pH of a flow of fluid as it passes through the filter cartridge. As a final example, the lower layer can include multiple cationic IERs. The non-filtration medium, or media, can be inert material(s) that imposes no significant effect on the chemical content of the fluid flow.

TABLE 1

| Upper Layer | Lower Layer |
| --- | --- |
| ACF | Single IER |
| IERF | Multiple IERs - mixed |
| Other non-woven | Anionic IER(s) |
| pH raising agent(s) | Cationic IER(s) |
| pH lowering agent(s) | |
| GAC | |
| Non-filtration medium | |

With continued reference to FIG. 5a, it can be seen that the first layer 152 is positioned directly on top of the second layer 154, or otherwise positioned so that effluent from the first layer 152 is directed into the second layer 154, such as at the top of the second layer 154. Thus, fluid entering the filter cartridge 150 enters the first layer 152 as influent and then passes through the first layer 152, exiting as effluent from the first layer 152. The effluent from the first layer 152 is the influent to the second layer 154. Where the first layer 152 includes a medium (or media) that serves to change the pH of fluid passing through the first layer 152, the effluent from the first layer 152 may have a relatively higher, or lower, pH than the influent to the first layer 152.

In the aforementioned, and other, embodiments, media position in the chamber of the filter cartridge can be determined by considerations additional, or alternative, to considerations relating to pH effects desired to be implemented. For example, media placement in the chamber can be based in part on the fluid flow characteristics associated with various media types and their placement. By way of illustration, media types, such as IERs for example, that tend to swell as they wet out may be placed closest to the filter cartridge exit, while other types of media, such as GAC and nonwovens for example, are placed closest to the inlet of the filter cartridge. In this example arrangement, a fluid flow rate through the filter cartridge may be relatively higher than if swelling media types were placed near the filter cartridge entrance, since those media types would tend to impair, at least for a period of time, the entrance of fluid into, and passage of the fluid through, the filter cartridge.

Turning now to FIG. 5b, details are provided concerning another example embodiment of a filter cartridge, denoted generally at 170. As will be apparent from a comparison of FIGS. 5a and 5b, the physical configuration of the filter cartridge 170 is different from that of the filter cartridge 150, although they are similar in operation. It should be understood however, that any of the layering schemes or configurations disclosed herein can be used in either of the filter cartridge 150 or filter cartridge 170 configurations, or in any of the other filter cartridge configurations that form part of the present disclosure.

The filter cartridge 170 includes media that comprises, or consists of, three layers of media, namely, first layer 172, second layer 174 and third layer 176. In at least some implementations, the layers 172-176 are stacked one on top of the other so that there is little, or no, space between successive layers. In other embodiments, a space or gap can be provided between layers 172 and 174 and/or between layers 174 and 176. These gaps may, or may not, include additional media such as are disclosed herein. In one particular example, the first layer 172 comprises, or consists of, one or more non-woven materials, examples of which include ACF and IERF, as well as chemically inert non-wovens. Where ACF is employed, it can be in a sheet form that may be used alone, or laminated between two pieces of non-woven material. In other embodiments, the ACF can be in the form of loose fibers, or any other form disclosed herein.

The first layer 172, regardless of the non-woven(s) employed, may include one or more agents that can serve to change the pH of a fluid as the fluid passes through the first layer 172. Thus, for example, the first layer 172 includes one or more buffering agents that serve to lower the pH of a fluid as that fluid passes through the first layer 172. In an alternative embodiment, the non-wovens can be omitted from the first layer 172 and the first layer 172 can instead comprise, or consist of, one or more filtration media that also comprise a pH modifying agent, or agents.

With continued reference to the example of FIG. 5b, the second layer 174 can include a carbon-based filtration medium, or media. In one particular implementation, the second layer 174 comprises, or consists of, GAC. Where activated carbon is employed as a filtration medium, it can take any of the other forms disclosed herein, such as fibers or blocks for example, and is not limited to use in a granulated form. Where the second layer 174 comprises, or consists of GAC, the GAC can include one or more agents that serve to change the pH of effluent from the first layer 172. Thus, in some embodiments, one or both of the first layer 172 and second layer 174 may include an agent, or agents, that serve to change the pH of a fluid as it passes through one or both of those layers, either by raising or lowering the pH of that fluid.

As further indicated in the example of FIG. 5b, a third layer 176 can be provided that is positioned beneath the second layer 174. The third layer 176 can include any of a variety of media that serves to remove one or more materials from fluid passing through the third layer 176. For example, in some embodiments, the third layer 176 includes one or more materials that remove one or more metals, such as zinc for example, from fluid passing through the third layer 176. The third layer 176 can thus include one or more resins, such as cationic resins or anionic resins, depending upon the material(s) desired to be removed from the fluid passing through the filter cartridge 170. As well, the third layer 176 may comprise, or consist of, a single resin.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A filter cartridge comprising:
  a housing having a fluid entry port and a fluid exit port, and the housing further including a chamber in fluid communication with the fluid entry port and the fluid exit port;
  a first medium in the form of a first layer and disposed within the chamber, the first medium comprising an activated carbon fiber sheet and a material selected from a group consisting of aluminum sulfate, calcium citrate, sodium citrate, calcium acetate, magnesium acetate, and sodium acetate, wherein water entering the first layer having a pH of between about 7 to about 8 is lowered in pH by the first medium such that water exiting the first layer has a pH of about 4; and
  a filtration medium in the form of a second layer and disposed in the chamber adjacent to and downstream of the first medium and arranged to receive effluent of the first medium, the filtration medium comprising a weak acid cation ion exchange resin configured to remove a selected metal from the fluid passing through the filtration medium.

2. The filter cartridge as recited in claim 1, wherein the first medium is a filtration medium.

3. The filter cartridge as recited in claim 1, wherein the material in the first medium serves to increase the acidity of a fluid passing through the first medium such that fluid entering the filtration medium from the first medium is relatively more acidic than fluid entering the first medium.

4. The filter cartridge as recited in claim 1, wherein the filter cartridge has a body substantially made of plastic and the filter cartridge is predominantly white in color.

5. A filter cartridge for filtering water comprising:
   a housing having a fluid entry port and a fluid exit port, wherein the housing further including a chamber in fluid communication with the fluid entry port and the fluid exit port;
   a first medium disposed within the chamber in a first medium layer, wherein the first medium layer is defined by a layer of a non-woven material made of fibers, wherein the first medium is disposed within the layer of non-woven material defining the first medium layer, wherein the first medium is a material selected from a group consisting of aluminum sulfate, calcium citrate, sodium citrate, calcium acetate, magnesium acetate, and sodium acetate, wherein water entering the first layer having a pH of between about 7 to about 8 is lowered in pH by the first medium such that water exiting the first layer has a pH of about 4; and
   a filtration medium disposed in the chamber in a second layer adjacent to and downstream of the first medium arranged to receive effluent of the first medium, wherein the filtration medium comprises a weak acid cation exchange resin.

6. The filter cartridge as recited in claim 5, wherein the first medium and the filtration medium are arranged in separate distinct first and second layers within the chamber.

7. The filter cartridge as recited in claim 6, wherein the first medium comprises granular activated carbon in contact with the filtration medium.

8. The filter cartridge as recited in claim 5, wherein the first medium further comprises a second filtration medium.

9. The filter cartridge as recited in claim 5, wherein the first layer is in direct contact with the second layer.

10. The filter cartridge as recited in claim 5, wherein the filtration medium comprises an ion exchange resin (IER).

11. The filter cartridge as recited in claim 5, wherein the first medium layer comprises activated carbon fiber and/or ion exchange resin fiber.

\* \* \* \* \*